(12) United States Patent  (10) Patent No.: US 8,744,752 B2
Sung et al.  (45) Date of Patent: Jun. 3, 2014

(54) APPARATUS AND METHOD FOR DETECTING LOCATIONS OF VEHICLE AND OBSTACLE

(75) Inventors: Kyung-Bok Sung, Daejeon (KR); Dong-Yong Kwak, Daejeon (KR); Dong-Sun Lim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 40 days.

(21) Appl. No.: 13/282,109

(22) Filed: Oct. 26, 2011

(65) Prior Publication Data

US 2012/0101719 A1  Apr. 26, 2012

(30) Foreign Application Priority Data

Oct. 26, 2010  (KR) .................. 10-2010-0104755

(51) Int. Cl.
  *G06G 7/78*  (2006.01)
(52) U.S. Cl.
  USPC .......................................... 701/409; 701/300
(58) Field of Classification Search
  None
  See application file for complete search history.

(56) References Cited

U.S. PATENT DOCUMENTS

| 7,142,150 | B2* | 11/2006 | Thackray ......................... 342/54 |
| 7,266,477 | B2* | 9/2007 | Foessel ........................... 702/189 |
| 8,364,366 | B2* | 1/2013 | Foessel et al. .................... 701/70 |
| 2001/0018640 | A1* | 8/2001 | Matsunaga ...................... 701/301 |
| 2007/0083557 | A1* | 4/2007 | Leiserowitz et al. ....... 707/104.1 |
| 2008/0167819 | A1* | 7/2008 | Breed ............................ 701/300 |
| 2010/0217439 | A1* | 8/2010 | Park et al. ...................... 700/258 |
| 2010/0305858 | A1* | 12/2010 | Richardson ................... 701/301 |
| 2011/0010033 | A1* | 1/2011 | Asahara et al. ................. 701/26 |
| 2011/0178709 | A1* | 7/2011 | Park et al. ..................... 701/300 |
| 2011/0255741 | A1* | 10/2011 | Jung et al. ..................... 382/103 |

FOREIGN PATENT DOCUMENTS

| JP | 1997-090033 A | 4/1997 |
| KR | 1020090065992 A | 6/2009 |

OTHER PUBLICATIONS

Kwak Dong Yong et al., "A Study on the Automatic Vehicle Guidance Systems using IT Infrastructure", Journal of Korea Information and Communications Society, 2010, pp. 264-265.

Hoonje Woo et al., "Obstacle Avoidance for Unmanned Ground Vehicle using Multiple Laser Scanners", Journal of KSAE, 2009, pp. 960-965.

* cited by examiner

*Primary Examiner* — Behrang Badii
*Assistant Examiner* — Demetra Smith-Stewart

(57) ABSTRACT

Disclosed herein is an apparatus for detecting locations of a vehicle and an obstacle. The apparatus for detecting locations of a vehicle and an obstacle includes at least one distance measurement unit and a data processing unit. The distance measurement unit measures distance data relevant to a vehicle and an obstacle within a measurement area. The data processing unit maps the distance data on a grid layer, detects the location of the vehicle based on the result of the mapping, detects the location of the obstacle based on the detected location of the vehicle, and modifies the detected location of the vehicle using the distance data.

19 Claims, 4 Drawing Sheets

APPARATUS AND METHOD FOR DETECTING LOCATIONS OF VEHICLE AND OBSTACLE

CROSS REFERENCE TO RELATED APPLICATION

This application claims the benefit of Korean Patent Application No. 10-2010-0104755, filed on Oct. 26, 2010, which is hereby incorporated by reference in its entirety into this application.

BACKGROUND OF THE INVENTION

1. Technical Field

The present invention relates generally to an apparatus and method for detecting the locations of a vehicle and an obstacle and, more particularly, to an apparatus and method for detecting the locations of a vehicle and an obstacle using a laser scanner.

2. Description of the Related Art

An unmanned autonomous vehicle detects an obstacle in such a way as to mount radar, laser radar (lidar) and image sensors on a vehicle, and detects a current location in such a way as to mount a high performance Global Positioning System (GPS), thereby performing unmanned autonomous travel.

However, since sensors mounted on a vehicle can be used only for the corresponding vehicle, it is troublesome to mount sensors on all unmanned vehicles in order to operate a plurality of unmanned vehicles.

A high performance GPS has the disadvantage of the usable area thereof being restricted to open space since GPS signals might be interrupted by buildings and roofs. Further, since a high performance GPS is an expensive apparatus, there is a problem in that the price of the whole unmanned vehicle system rises.

SUMMARY OF THE INVENTION

Accordingly, the present invention has been made keeping in mind the above problems occurring in the prior art, and an object of the present invention is to provide an apparatus and method for detecting the locations of an unmanned autonomous vehicle and an obstacle using a laser scanner which senses a predetermined space.

In order to accomplish the above object, an apparatus for detecting locations of a vehicle and an obstacle according to the present invention, includes at least one distance measurement unit for measuring distance data relevant to a vehicle and an obstacle within a measurement area; and a data processing unit for mapping the distance data onto a grid layer, detecting the location of the vehicle based on the result of the mapping, detecting the location of the obstacle based on the detected location of the vehicle, and modifying the detected location of the vehicle using the distance data.

The data processing unit generates an outline which has the same size as that of the vehicle, repeatedly calculates a mapping score while the location of the outline is varied on the grid layer, and determines the center point of an outline, which has the highest mapping score, as the location of the vehicle.

The mapping score corresponds to the number of cells which overlap the outline from among mapped grid cells which corresponds to the result of mapping the distance data onto the grid layer.

The data processing unit generates a circle which has a size corresponding to that of the vehicle based on the detected location of the vehicle, calculates a hit score while the center of the circle is varied, and sets a center of a circle corresponding to the highest hit score to the location of the vehicle.

The hit score corresponds to the number of pieces of distance data included in the circle.

The data processing unit detects a remaining grid cell, other than the grid cell corresponding to the location of the vehicle from among the result of mapping the distance data onto the grid layer, as the location of the obstacle.

The distance measurement unit corresponds to a laser scanner.

A method for detecting locations of a vehicle and an obstacle using a laser scanner according to another embodiment of the present invention, includes measuring distance data from the laser scanner to the vehicle and the obstacle using the laser scanner; mapping the distance data onto a grid layer; detecting the location of the vehicle using a mapped grid cell which corresponds to the result of the mapping; detecting the location of the obstacle based on the location of the vehicle; and modifying the location of the vehicle using the distance data.

The detecting the location of the vehicle includes: generating an outline which has the same size as that of the vehicle; varying the location of the outline in the grid layer; calculating a mapping score which corresponds to the number of mapped grid cells which overlap the outline; and detecting the location of the vehicle based on the mapping score.

The detecting the location of the vehicle based on the mapping score includes: repeatedly calculating the mapping score while the location of the outline is varied; and detecting the center point of an outline as the location of the vehicle, the outline corresponding to the highest mapping score of the result of the repeatedly performed calculation.

The modifying the location of the vehicle using the distance data includes: generating a circle which has a size corresponding to that of the vehicle based on the location of the vehicle; varying the center of the circle and calculating a hit score corresponding to the varied center of the circle; and modifying the location of the vehicle based on the center of a circle which has the highest hit score.

The hit score corresponds to the number of pieces of distance data included in the circle.

The detecting the location of the obstacle includes: detecting a remaining grid cell, other than the grid cell corresponding to the location of the vehicle from among the mapped grid cells, as the location of the obstacle.

A method for detecting locations of a vehicle and an obstacle according to another embodiment of the present invention, includes measuring distance data relevant to a vehicle and an obstacle using a location detection apparatus; mapping the distance data onto a grid layer; varying the location of an outline which corresponds to the vehicle in the grid layer and calculating a mapping score; detecting the location of the vehicle based on the mapping score; detecting the location of the obstacle based on the location of the vehicle; generating a circle which corresponds to the vehicle based on the location of the vehicle in the grid layer; and varying the location of the circle, and modifying the location of the vehicle based on a hit score corresponding to the varied circle.

The mapping score corresponds to the number of cells which overlap the outline from among mapped grid cells which corresponds to the result of mapping the distance data onto the grid layer.

The hit score corresponds to the number of pieces of distance data included in the circle.

The detecting the location of the vehicle includes detecting a center point of an outline, which has the highest mapping score from among a result in which the location of the outline is varied and the mapping score is calculated, as the location of the vehicle.

The detecting the location of the obstacle includes detecting a remaining grid cell, other than the grid cell corresponding to the location of the vehicle from among the result of mapping the distance data onto the grid layer, as the location of the obstacle.

The modifying the location of the vehicle includes: calculating a hit score while the location of the circle is varied; and modifying the center of a circle, which corresponds to the highest hit score from among calculated hit scores, as the location of the vehicle.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
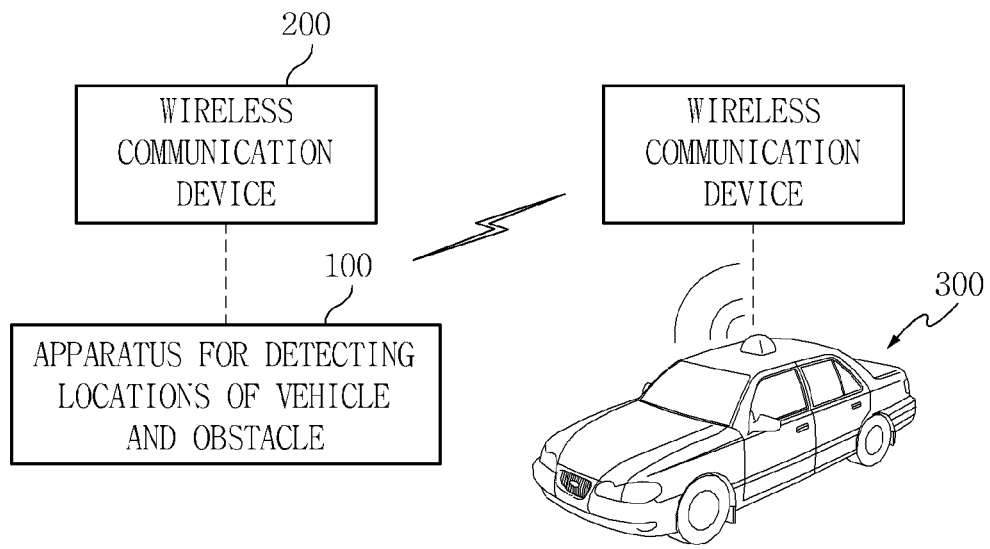
FIG. 1 is a view illustrating a service environment in which the locations of a vehicle and an obstacle are detected according to an embodiment of the present invention.

The present invention will be described in detail with reference to the accompanying drawings below. Here, when repeated description and detailed descriptions of well-known functions or configurations may unnecessarily obscure the gist of the present invention, the detailed descriptions will be omitted. The embodiments of the present invention are provided to further completely explain the present invention to those skilled in the art. Therefore, the shapes and sizes of components in the drawings may be exaggerated for the sake of a more exact description.

An apparatus and method for detecting the locations of a vehicle and an obstacle according to an embodiment of the present invention will be described in detail below with reference to the accompanying drawings.

Figure 2:
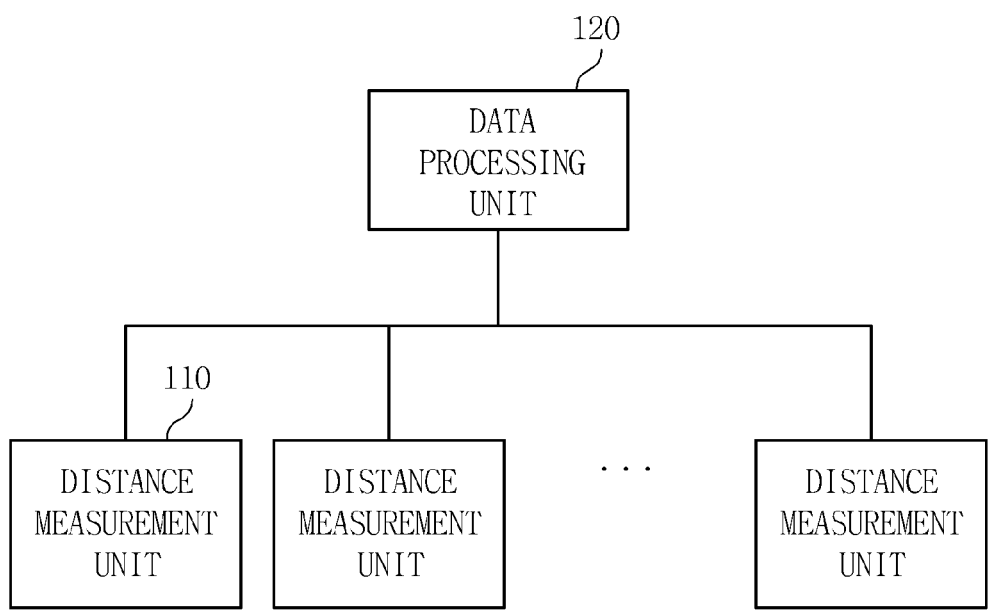
FIG. 2 is a diagram illustrating an apparatus for detecting the locations of a vehicle and an obstacle according to an embodiment of the present invention.

FIG. 1 is a view illustrating a service environment in which the locations of a vehicle and an obstacle are detected according to an embodiment of the present invention, and FIG. 2 is a diagram illustrating an apparatus for detecting the locations of a vehicle and an obstacle according to the embodiment of the present invention.

Referring to FIG. 1, the service environment according to the embodiment of the present invention includes an apparatus for detecting the locations of a vehicle and an obstacle (hereinafter referred to as "location detection apparatus") 100, a wireless communication device 200, and an unmanned vehicle 300.

The location detection apparatus 100 detects the locations of a vehicle and an obstacle based on a result output from a laser scanner. Next, the location detection apparatus 100 transmits the locations of the vehicle and the obstacle to the unmanned vehicle 300 through the wireless communication device 200.

The unmanned vehicle 300 controls the vehicle based on the current location of the unmanned vehicle 300 and the location of the obstacle, which were received via the wireless communication device 200.

Referring to FIG. 2, the location detection apparatus 100 includes at least one distance measurement unit 110 and a data processing unit 120.

The distance measurement unit 110 is installed at every predetermined interval, and is configured to measure distance data relevant to at least one object within a corresponding measurement area. Here, the measurement area is included in a set range based on a location at which the single distance measurement unit 110 is located.

At least one distance measurement unit 110 according to the embodiment of the present invention may correspond to a 2 dimensional or 3 dimensional layer scanner based on Light Detection And Ranging (LIDAR) but is not limited thereto.

The distance data measured using the distance measurement unit 110 corresponds to a distance based on an angle made with an object within the measurement area. In order to detect the locations of an actual vehicle and an obstacle, the distance data needs to be processed.

The data processing unit 120 maps the distance data received from the distance measurement unit 110 onto a grid layer, and detects the locations of the vehicle and the obstacle based on the results of the mapping.

The grid layer according to the embodiment of the present invention is, for example, a set of data in which a predetermined area is divided into grids in order to express the predetermined area using a specific apparatus such as a computer.

In particular, the data processing unit 120 detects the location of the vehicle based on the result of mapping the distance data to the grid layer, and then detects the location of the obstacle based on the detected location of the vehicle. Further, the data processing unit 120 modifies the detected location of the vehicle using the distance data, measured using the distance measurement unit 110, thereby improving the result of the detection of the location of the vehicle.

Further, the data processing unit 120 connected to two or more distance measurement units 110 collects each piece of distance data received from each of the distance measurement units 110, and then detects the locations of the vehicle and the obstacle based on the result of the collection.

Next, a method of detecting the locations of a vehicle and an obstacle using the location detection apparatus 100 will be described in detail with reference to FIG. 3.

Figure 3:
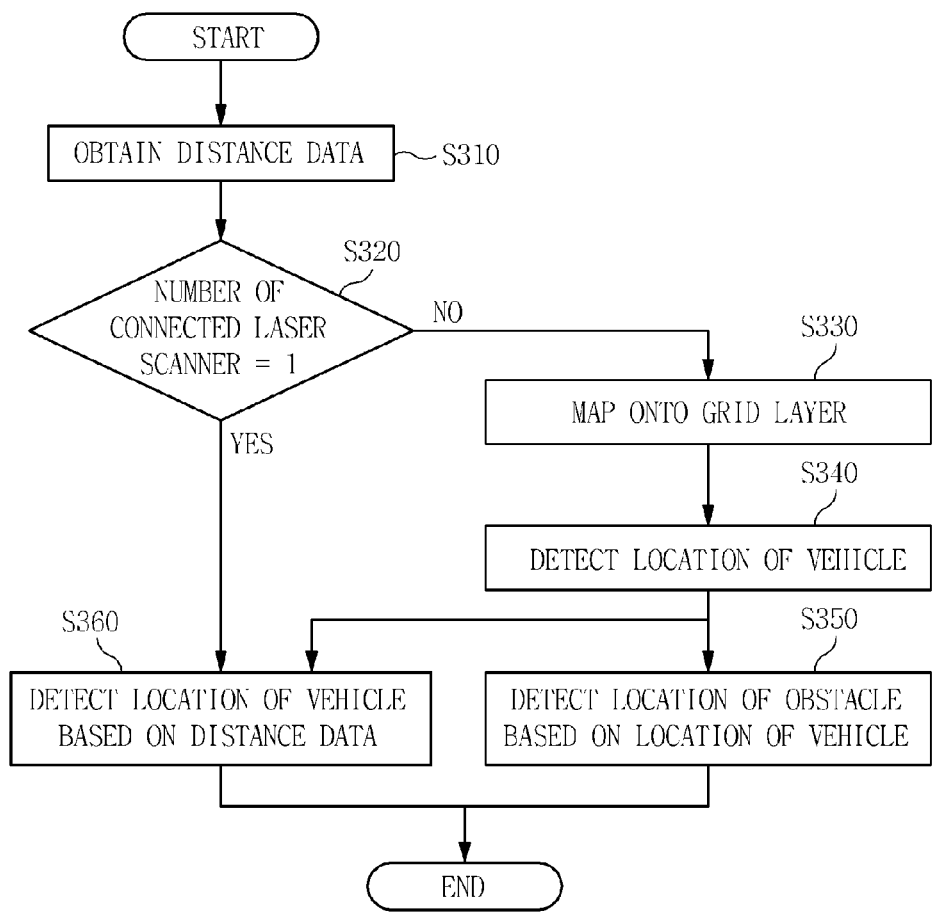
FIG. 3 is a flowchart illustrating a method of detecting the locations of a vehicle and an obstacle according to an embodiment of the present invention.

FIG. 3 is a flowchart illustrating a method of detecting the locations of a vehicle and an obstacle according to an embodiment of the present invention.

First, the location detection apparatus 100 according to the embodiment of the present invention includes at least one laser scanner corresponding to at least one distance measurement unit 110.

Referring to FIG. 3, the location detection apparatus 100 obtains distance data using a laser scanner at step S310. Here, the laser scanner is installed at every predetermined section and configured to measure distance data relevant to one or more objects within a corresponding measurement area. Here, the distance data is generally expressed in units of 1 cm.

The location detection apparatus 100 determines whether the number of laser scanners corresponding to the obtained distance data is one at step S320.

When the number of the laser scanners is not one, the location detection apparatus 100 maps the obtained distance data onto a grid layer at step S330. Here, the grid layer includes data which has been divided into grids, that is, a plurality of cells. The size of one cell of the plurality of cells is set such that the size is larger than the reference unit of the distance data, and usually set such that the size falls within the range of 20 to 50 cm.

In the present invention, one cell within the grid layer is called a grid cell. Further, when a grid cell maps the distance data, the grid cell includes the distance data and is called a mapped grid cell.

The location detection apparatus 100 detects the location of a vehicle using the result of the mapping, that is, the mapped grid cell at step S340. Here, since the location detection apparatus 100 detects the location of the vehicle based on the grid layer, accuracy is too low to use the detected location of the vehicle for unmanned travel.

Next, the location detection apparatus 100 detects the location of an obstacle based on the detected location of the vehicle at step S350. Here, the location of the obstacle corresponds to a remaining mapped grid cell other than the mapped grid cell corresponding to the vehicle from among the mapped grid cells of the grid layer based on the detected location of the vehicle.

At the same time that the location of the obstacle is detected, the location detection apparatus 100 detects the location of the vehicle again in such a way as to modify the location of the vehicle, detected using the mapped grid cell, using distance data obtained using the laser scanner at step S360. Further, when the number of the laser scanners is one, the location detection apparatus 100 detects the location of the vehicle using the distance data obtained using the laser scanner.

Next, a method of detecting the location of a vehicle using the location detection apparatus 100 based on a grid layer will be described in detail with reference to FIG. 4.

Figure 4:
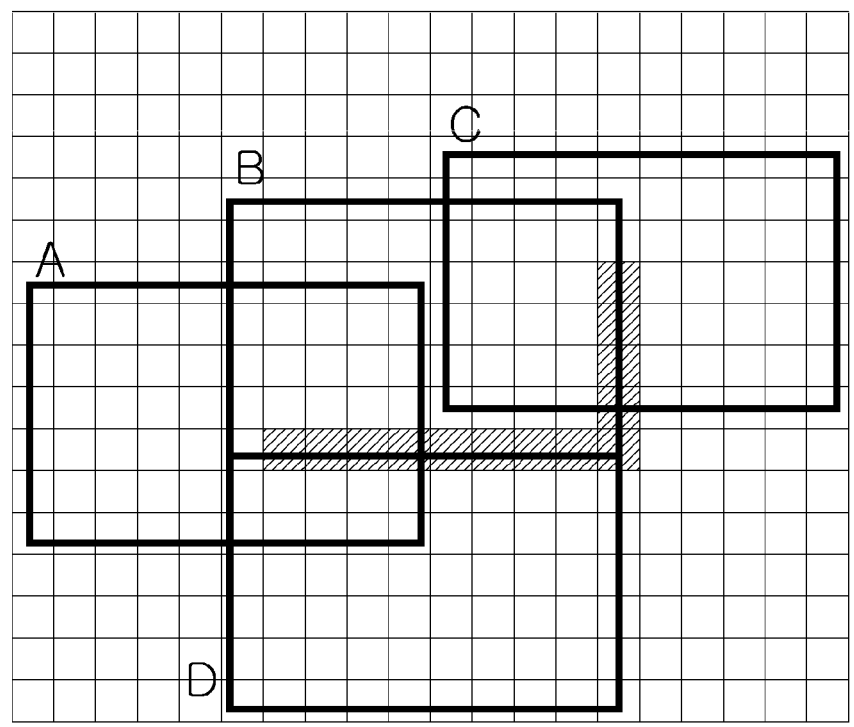
FIG. 4 is a view illustrating a method of detecting the location of a vehicle based on a grid layer according to an embodiment of the present invention.

FIG. 4 is a view illustrating a method of detecting the location of a vehicle based on a grid layer according to an embodiment of the present invention.

The location detection apparatus 100 according to the embodiment of the present invention detects the location of a vehicle using an outline detection method based on a grid layer.

The outline detection method is applied to situations in which the size of a vehicle was previously known. That is, the location detection apparatus 100 according to the embodiment of the present invention previously set the size of the vehicle or receives the size of the vehicle from the unmanned vehicle 300 via the wireless communication device 200 before the location of the vehicle is detected.

The location detection apparatus 100 generates a rectangle (hereinafter referred to as "outline") which has the same size as the vehicle, and calculates the number of the mapped grid cells which overlap the corresponding outline. Here, the number of the mapped grid cells which overlap the corresponding outline is set to a mapping score.

Next, the location detection apparatus 100 repeatedly calculates the mapping score while the location of the outline is varied, and then determines the center point of the outline, which has the highest mapping score, as the location of the vehicle.

FIG. 4 illustrates the results in which the distance data maps the grid cells of a grid layer. Referring to FIG. 4, outlines A, B, C and D are located in places which are different from each other. Further, one or more empty grid cells indicate a space in which there is no obstacle, and one or more filled grid cells indicate the mapped grid cells, that is, space in which one or more objects exist.

When such a type of grid layer exists, the location detection apparatus 100 generates an outline, and calculates a mapping score while the location of the outline moves in the order of A, B, C, and D. Here, although the location detection apparatus 100 moves the location of the outline in the predetermined direction, the present invention is not limited thereto.

The results of such a calculation are that each of the mapping scores of the outlines A and C is "1", the mapping score of the outline B is "13", and the mapping score of the outline D is "9".

The location detection apparatus 100 determines the center point of the outline B, which has the highest mapping score from among the results of the mapping score calculation, as the center location of the unmanned vehicle 300.

As described above, since the mapping score is calculated based on a grid layer in the outline detection method according to the embodiment of the present invention, the amount of calculation is small, so that there is an advantage in that the location of the unmanned vehicle 300 can be rapidly detected.

Further, the location detection apparatus 100 detects the location of the vehicle using the outline detection method based on a grid layer, and then detects the location of the unmanned vehicle 300 again based not on a grid layer but on distance data, thereby increasing the accuracy of location detection.

Next, a method of detecting the location of the unmanned vehicle 300 again based not on a grid layer but on distance data using the location detection apparatus 100 will be described in detail with reference to FIG. 5.

Figure 5:
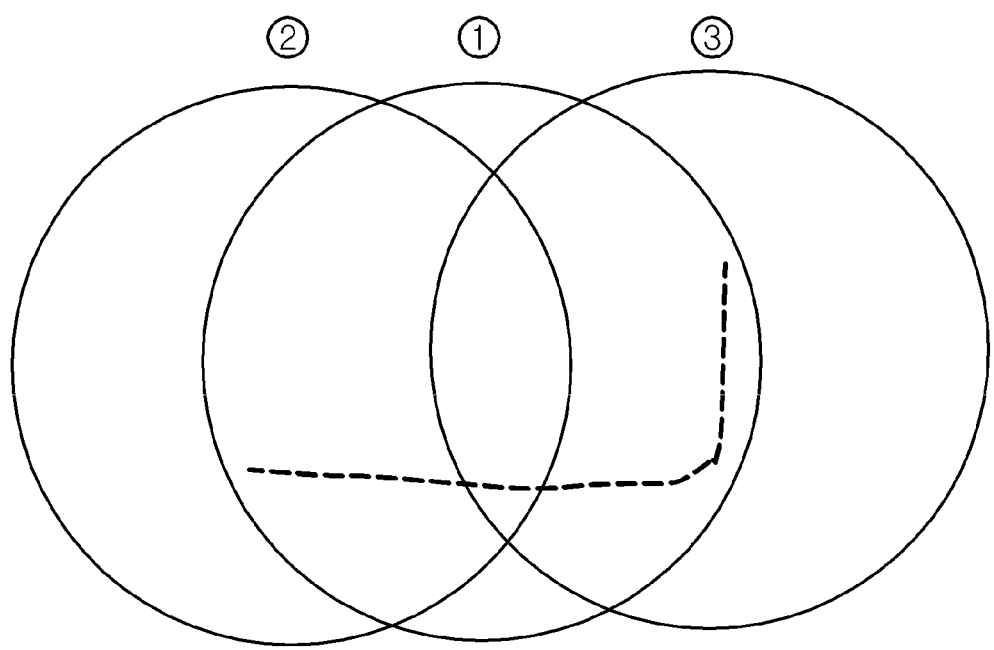
FIG. 5 is a view illustrating a method of detecting the location of a vehicle based on distance data according to an embodiment of the present invention.

FIG. 5 is a view illustrating a method of detecting the location of a vehicle based on distance data according to an embodiment of the present invention.

The location detection apparatus 100 according to the embodiment of the present invention detects the location of a vehicle using the outline detection method based on a grid layer, and modifies the detected location of the vehicle in such a way that a circle detection method is applied to distance data measured using the distance measurement unit 110.

The location detection apparatus 100 generates a circle which has a size corresponding to that of the vehicle, and calculates the number of pieces of distance data existing in the corresponding circle. Here, the number of pieces of distance data existing in the corresponding circle is set to a hit score.

Next, the location detection apparatus 100 repeatedly calculates the hit score while the center of a circle is varied within a predetermined range, and then determines the center point of a circle which has the highest hit score as the location of the vehicle.

In FIG. 5, a dotted line indicates the measurement result, that is, distance data, obtained using the distance measurement unit 110. Here, since the distance data includes errors unlike the distance data mapped to the grid layer, the distance data may not be expressed in a straight line and the present invention is not limited thereto.

The location detection apparatus 100 calculates the number of pieces of distance data, that is, a hit score, included in a corresponding circle from a first circle ① centering around the location of the vehicle detected using the outline detection method. For example, the location detection apparatus 100 calculates the hit score of each of different circles while the center of a circle is moved from that of a second circle ② to that of a third circle ③ within a predetermined range.

The location detection apparatus 100 determines the center of a circle, which has the highest hit score based on the results of the calculation of the hit scores, as the location of the vehicle.

In the circle detection method, a process of moving the center of a circle and calculating a hit score using distance data corresponding to each circle is repeated, so that a disadvantage of a large amount of calculation arises. Therefore, when the location of the unmanned vehicle 300 is detected in such a way as that the circle detection method is applied to the whole area, there are problems in that it takes long time to calculate a hit score, and that the time is delayed until the location of the vehicle is detected.

In order to solve the problems, the location detection apparatus 100 according to the embodiment of the present invention sets the starting point of the circle detection method to the location of a vehicle which was detected using the outline detection method, and allows the center of a circle to be moved only within a predetermined range.

Therefore, the location detection apparatus 100 according to the embodiment of the present invention can approximately detect the location of a vehicle based on a grid layer, can accurately collect the location of the vehicle which was approximately detected using the circle detection method, and can reduce the time required by the calculation.

According to an embodiment of the present invention, the apparatus and method for detecting the locations of a vehicle and an obstacle can detect the location of a vehicle as well as the location of an obstacle using a laser scanner within a predetermined section. In particular, the apparatus for detecting the locations of a vehicle and an obstacle detects the location of a vehicle using an outline detection method and a circle detection method based on a grid layer, thereby increasing the accuracy of location detection.

Further, according to an embodiment of the present invention, the apparatus for detecting the locations of a vehicle and an obstacle can detect the locations of a vehicle and an obstacle using a single device, and can be commonly applied to a plurality of unmanned vehicles which exist within a corresponding space.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for detecting locations of a vehicle and an obstacle in an environment, comprising:
    at least one distance measurement unit installed at a predetermined location in the environment, the distance measurement unit being configured to measure distance data associated with a location of a vehicle and an obstacle within a measurement area in the environment; and
    a data processing unit configured to map the distance data on a grid layer, detect the location of the vehicle based on a result of the mapping, detect the location of the obstacle based on the detected location of the vehicle, and modify the detected location of the vehicle using the distance data,
    wherein the data processing unit determines a remaining grid cell, other than a grid cell corresponding to the location of the vehicle from among the result of mapping the distance data on the grid layer, as the location of the obstacle.

2. The apparatus as set forth in claim 1, comprising at least two distance measurement units, wherein the data processing unit is configured to generate a plurality of outlines, each outline corresponding to a size of the vehicle, and each outline corresponding to a location on the grid layer, calculate a mapping score of each outline on the grid layer, and determine a center point of an outline that has a highest mapping score as the location of the vehicle.

3. The apparatus as set forth in claim 2, wherein the mapping score corresponds to a number of cells which overlap with an outline from among mapped grid cells, the mapped grid cells corresponding to a result of mapping the distance data on the grid layer.

4. The apparatus as set forth in claim 2, wherein the data processing unit is configured to modify the detected location of the vehicle by generating a plurality of circles, each of the plurality of circles having a size corresponding to that of the vehicle and each of the plurality of circles being generated based on the detected location of the vehicle, calculate a hit score for each circle, and set a center of a circle corresponding to a highest hit score to the location of the vehicle.

5. The apparatus as set forth in claim 4, wherein the hit score corresponds to a number of pieces of distance data included in the circle.

6. The apparatus as set forth in claim 2, comprising at least two distance measurement units installed at a predetermined interval in the environment, wherein at least one distance measurement unit comprises a laser scanner.

7. The apparatus as set forth in claim 1, wherein the distance measurement unit corresponds to a laser scanner.

8. A method for detecting locations of a vehicle and an obstacle in an environment using a laser scanner installed at a predetermined location in the environment, comprising:
    measuring distance data from the laser scanner to the vehicle and the obstacle using the laser scanner;
    mapping the distance data on a grid layer;
    detecting a location of the vehicle using a mapped grid cell which corresponds to a result of the mapping;
    detecting a location of the obstacle based on the location of the vehicle; and
    modifying the location of the vehicle using the distance data,
    wherein the detecting the location of the obstacle comprises:
    detecting a remaining grid cell, other than a grid cell corresponding to the location of the vehicle from among the mapped grid cells, as the location of the obstacle.

9. The method as set forth in claim 8, wherein the detecting the location of the vehicle comprises:
    generating an outline which has the same size as that of the vehicle;
    varying a location of the outline in the grid layer so that a plurality of outlines are provided, each outline corresponding to a location in the grid layer;
    calculating a mapping score for each outline, the mapping score corresponding to a number of mapped grid cells which overlap the outline; and
    detecting the location of the vehicle based on the mapping score.

10. The method as set forth in claim 9, wherein the detecting the location of the vehicle based on the mapping score comprises:

detecting a center point of one outline as the location of the vehicle, the one outline corresponding to a highest mapping score.

11. The method as set forth in claim 8, wherein the modifying the location of the vehicle using the distance data comprises:
generating a circle which has a size corresponding to that of the vehicle based on the location of the vehicle;
varying a center of the circle so that a plurality of circles are provided, each circle having a different center;
calculating a hit score corresponding to the center each circle; and
modifying the location of the vehicle based on the center of a circle having the highest hit score.

12. The method as set forth in claim 11, wherein the hit score corresponds to the number of pieces of distance data included in the circle.

13. A method for detecting locations of a vehicle and an obstacle in an environment, comprising:
measuring distance data associated with a vehicle and an obstacle using a location detection apparatus installed at a predetermined location in the environment;
mapping the distance data to a grid layer;
varying a location of an outline which corresponds to the vehicle in the grid layer so that a plurality of outlines are provided, each outline corresponding to a location in the grid layer;
calculating a mapping score for each outline;
detecting the location of the vehicle based on the mapping score;
detecting the location of the obstacle based on the location of the vehicle;
generating a circle which corresponds to the vehicle based on the location of the vehicle in the grid layer;
varying a location of the circle so that a plurality of circles are provided, each circle corresponding to a location; and
modifying the location of the vehicle based on a hit score corresponding a circle.

14. The method as set forth in claim 13, wherein the mapping score corresponds to a number of cells which overlap an outline from among mapped grid cells, the mapped grid cells corresponding to the result of mapping the distance data on the grid layer.

15. The method as set forth in claim 13, wherein the hit score corresponds to a number of pieces of distance data included in the circle.

16. The method as set forth in claim 13, wherein the detecting the location of the vehicle comprises detecting a center point of an outline having a highest mapping score from among the outlines as the location of the vehicle.

17. The method as set forth in claim 13, wherein the detecting the location of the obstacle comprises detecting a remaining grid cell, other than the grid cell corresponding to the location of the vehicle from among the result of mapping the distance data on the grid layer, as the location of the obstacle.

18. The method as set forth in claim 13, wherein the modifying the location of the vehicle comprises:
calculating a hit score while the location of the circle is varied; and
determining a center of a circle having a highest hit score from among calculated hit scores, as the location of the vehicle.

19. The method according to claim 13, wherein the location of the circle is varied within a predetermined range.

* * * * *